(12) United States Patent
Yonezawa

(10) Patent No.: US 6,619,646 B2
(45) Date of Patent: Sep. 16, 2003

(54) CLAMPING APPARATUS

(75) Inventor: Keitaro Yonezawa, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 09/987,291

(22) Filed: Nov. 14, 2001

(65) Prior Publication Data

US 2002/0060387 A1 May 23, 2002

(30) Foreign Application Priority Data

Nov. 20, 2000 (JP) .................................. P 2000-352615

(51) Int. Cl.⁷ .................................................. B23Q 3/00
(52) U.S. Cl. ........................... 269/309; 269/32; 269/310
(58) Field of Search ........................ 269/32, 309, 48.1, 269/49, 50, 292, 293, 294, 20, 900, 310, 329, 91, 93, 94; 29/56.6, 57, 281.1; 409/219, 225, 227, 903; 408/79; 279/4, 121; 198/348

(56) References Cited

U.S. PATENT DOCUMENTS 5,971,380 A * 10/1999 Hebener ...................... 269/20
6,024,354 A * 2/2000 Yonezawa ................... 269/309
6,095,509 A * 8/2000 Yonezawa ................... 269/309
6,101,888 A * 8/2000 Yonezawa ...................... 74/54

FOREIGN PATENT DOCUMENTS

| DE | 42 00 365 A1 | 7/1993 |
| EP | 0 319 710 A2 | 6/1989 |
| EP | 0 803 316 A1 | 10/1997 |

\* cited by examiner

Primary Examiner—Joseph J. Hail, III
Assistant Examiner—Daniel Shanley
(74) Attorney, Agent, or Firm—Bacon & Thomas, PLLC

(57) ABSTRACT

A housing (4) has a cylinder bore (10) into which an annular hydraulic piston (11) is inserted vertically movably. The piston (11) has a tubular bore (11a) into which a driven rod (6) is inserted. The driven rod (6) is provided with an input portion (6a), around which a plurality of transmission members (15) are arranged peripherally side by side. The transmission members (15) swing to a disengaging position (Y) through a push member (30) by a lowering spring (31). When clamping, the piston (11) is driven upwards. Then, first, a slant cam (27) swings the transmission members (15) to an engageable position (X), thereby enabling engaging portions (17) to face the input portion (6a). Next, the piston (11) upwardly drives the input portion (6a) through the engaging portions (17).

6 Claims, 5 Drawing Sheets

CLAMPING APPARATUS

BACKGROUND OF THE INVENTION

1. Field of the Invention

The present invention relates to a clamping apparatus and more particularly to a clamping apparatus of the type that pulls a driven rod through a plurality of transmission members by an annular driving member.

2. Explanation of Related Art

A conventional example of the clamping apparatus of this type is recited in Japanese Patent Public Disclosure No. 9-285925 proposed earlier by the Assignee of the present invention. The conventional example is constructed as follows.

A driven rod is inserted into a tubular bore of a sleeve. The driven rod has one end portion provided with an input portion in the shape of a short column. A plurality of transmission balls are inserted into the other end portion of a peripheral wall of the sleeve and spaced apart from each other peripherally at a predetermined interval outside the other end of the input portion. These transmission balls are radially movable. When clamping, an operation cam externally fitted onto the sleeve moves the transmission balls radially inwards to make them engage with the input portion. The sleeve pulls the driven rod toward the one end through the transmission balls.

The conventional technique is excellent in that the operation cam can smoothly and reliably switch over the transmission balls to an engageable position. However, each of the transmission balls is brought into contact with the input portion almost as it makes a point contact therewith to result in limiting a transmission force. Therefore, it still has to be improved for strongly pulling the driven rod.

SUMMARY OF THE INVENTION

The present invention has an object to provide a clamping apparatus which exerts a strong pulling force.

In order to accomplish the above-mentioned object, the present invention has constructed a clamping apparatus in the following manner, for example, as shown in FIGS. 1 to 5.

An annular driving member 11 is axially movably inserted into a housing 4. The driving member 11 has a tubular bore 11a into which a driven rod 6 is inserted. The driven rod 6 is provided, at a portion near one end, with an input portion 6a. A plurality of transmission members 15 are arranged peripherally side by side around the input portion 6a. Each of the transmission members 15 is provided, at a portion close to the other end, with an engaging portion 17 which engages with the input portion 6a. The transmission members 15 can switch over between an engageable position (X) where the engaging portions 17 axially face the input portion 6a when the transmission members 15 swing radially inwards and a disengaging position (Y) where the facing is cancelled when they swing radially outwards. The transmission members 15 at the engageable position (X) are movable toward the one end by the driving member 11. The transmission members 15 swing from the disengaging position (Y) to the engageable position (X) by a first actuation means 26 and they swing from the engageable position (X) to the disengaging position (Y) by a second actuation means 32.

The present invention operates in the following manner, for example, as shown in FIGS. 2 to 4.

Under an unclamping condition shown in FIG. 2, the driving member 11 moves downwards, namely in a direction to the other end. The respective transmission members 15 switch over to the radially outward disengaging position (Y) by the second actuation means 32.

When driving the driven rod 6 for clamping, first, as shown in FIG. 3, the first actuation means 26 swings the transmission members 15 to the radially inward engageable position (X). This allows the engaging portions 17 provided in the transmission members 15 to face the input portion 6a from below. Subsequently, as shown in FIG. 4, the driving member 11 drives the transmission members 15 at the engageable position (X) upwards. This enables the engaging portion 17 of every transmission member 15 to push the input portion 6a upwards with the result of strongly pulling the driven rod 6 upwards.

The driven rod 6 is driven for unclamping by procedures substantially opposite to the above ones.

In consequence, the present invention offers the following advantages.

The plurality of transmission members are peripherally arranged side by side around the input portion of the driven rod. They swing radially inwards and then switch over to the engageable position. This allows the engaging portions of these transmission members to face the input portion so that they can make surface contact over substantially the whole periphery of the input portion. Accordingly, these transmission members can strongly pull the driven rod to result in the possibility of providing a strong clamping apparatus.

Besides, the transmission members swing so as to switch over between the engageable position and the disengaging position. This can reduce the strokes for engagement and disengagement of the first and the second actuation means in correspondence with a lever ratio for swinging the transmission members with the result of being able to make the clamping apparatus compact.

Further, the transmission members are arranged around the input portion of the driven rod. This can make the input portion and the transmission members axially overlap with each other. Therefore, the entire length of the housing can be shortened by an amount corresponding to the overlap to result in the possibility of making the clamping apparatus more compact.

The present invention includes the following clamping apparatus.

Each of the transmission members 15 has a portion near one end, which is provided on its outer peripheral portion with a fulcrum portion 16 swingably supported by the housing 4 and has another portion close to the other end, which is provided on its outer peripheral portion with a first portion 18 to be actuated for engagement. The first actuation means 26 is connected to the first portion 18. The portion near one end of every transmission member 15 is provided on its inner peripheral portion with a second portion 19 to be actuated for disengagement. The second actuation means 32 is connected to the second portion 19.

The above-mentioned invention positions the first portion to be actuated and the second portion to be actuated, radially eccentric from each other. This prevents the first and the second actuation means from being arranged in series axially to result in the possibility of reducing the axial length of the clamping apparatus.

The present invention furthermore includes the following clamping apparatus.

The second actuation means 32 comprises a push member 30 which is brought into contact with the second portions 19 of the transmission members 15, and a resilient member 31 which pushes the push member 30 toward the other end. This invention can make the second actuation means simple and compact to result in greatly downsizing the clamping apparatus.

The present invention still more includes the following clamping apparatus.

The driving member 11 comprises a fluid pressure piston. A fluid pressure actuation chamber 12 is formed between the driving member 11 and the other end wall 4a of the housing 4. Further, a return spring 13 is attached between the driving member 11 and one end wall 4b of the housing 4. The first actuation means 26 is provided with a slant cam 27 connected to the driving member 11. This invention can drive both of the driving member and the slant cam through pressurized fluid of the fluid pressure actuation chamber with the result of being able to form the clamping apparatus into a simple structure.

BRIEF DESCRIPTION OF THE DRAWINGS

FIG. 1 is a sectional view, when seen in elevation, of a state where a housing of a clamping apparatus is separated from a driven rod;

FIG. 2 is a sectional view of the clamping apparatus under an unclamping condition;

FIG. 3 is a sectional view showing a state where the clamping apparatus is changing over;

FIG. 4 is a sectional view of the clamping apparatus under a clamping condition; and FIG. 5 is a plan view of transmission portions under the clamping condition shown in FIG. 4.

DESCRIPTION OF THE PREFERRED EMBODIMENTS

Hereafter, explanation is given for an embodiment of the present invention by relying on FIGS. 1 to 5.

Figure 1:
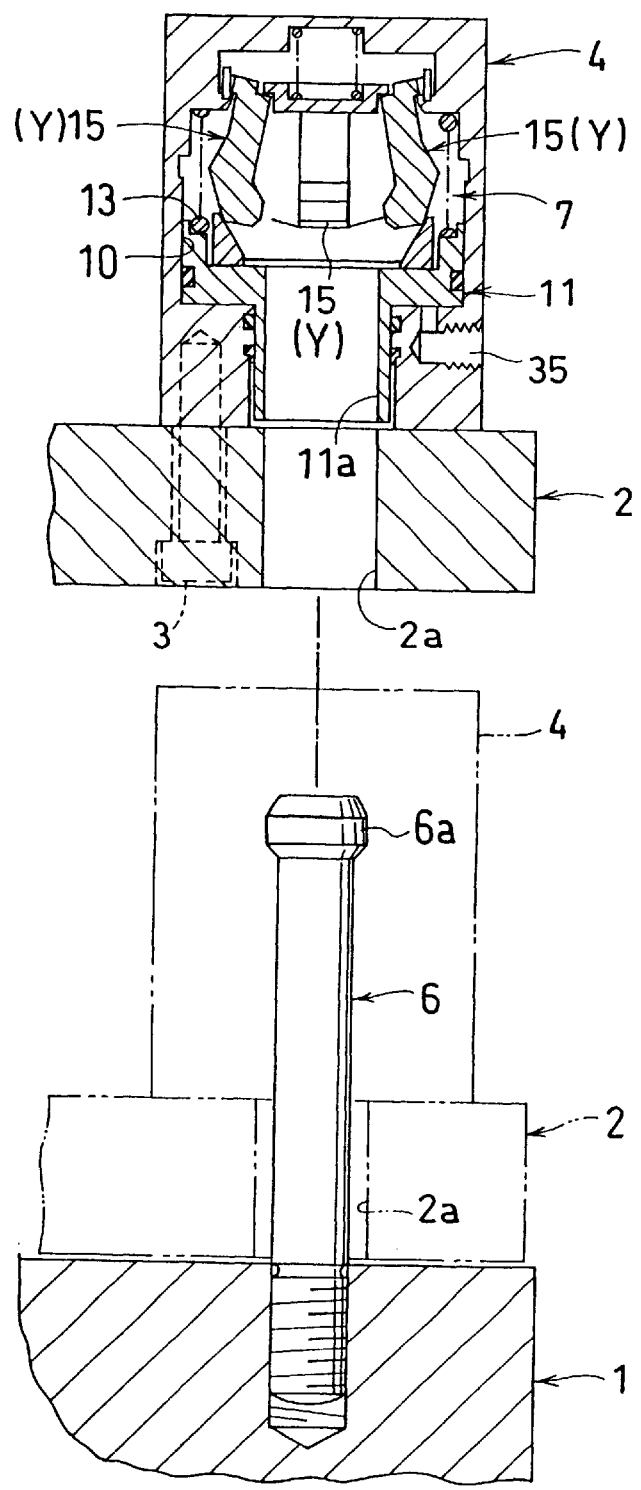
FIGS. 1 to 5 show an embodiment of the present invention.

First, a clamping apparatus is outlined by resorting to a whole view of FIG. 1. As shown in FIG. 1, this embodiment exemplifies a case where the clamping apparatus pushes an object 2 to be fixed onto an upper surface of a fixing pedestal 1.

More specifically, a housing 4 is fixed to an upper surface of the object 2 to be fixed by a plurality of bolts 3, only one of which is illustrated. A driven rod 6 is secured to the upper surface of the fixing pedestal 1 in screw-thread engagement. The object 2 to be fixed is formed with a through hole 2a into which the driven rod 6 is inserted.

When fixing the object 2 to the fixing pedestal 1, first, the object 2 and the housing 4 are lowered from a separate state shown by a full line in FIG. 1 to a state illustrated by a two-dot chain line and are externally fitted onto the driven rod 6 (see FIG. 2 to be mentioned later). Next, a hydraulic clamping mechanism 7 within the housing 4 upwardly pulls an input portion 6a at an upper end of the driven rod 6. At the same time, there acts on the housing 4 from the clamping mechanism 7, a downward reaction force which downwardly pushes the object 2 to be fixed (see FIG. 4 to be mentioned later). Thus the object 2 is fixed to the upper surface of the fixing pedestal 1.

A concrete structure of the clamping apparatus is explained by relying on FIGS. 2 to 5.

An annular hydraulic piston 11 of a driving member is inserted into a cylinder bore 10 of the housing 4 vertically movably and hermetically. The through hole 2a of the object 2 to be fixed is arranged substantially coaxially with the cylinder bore 10.

A hydraulic actuation chamber 12 is formed between a lower end wall (a second end wall of the other end wall) 4a of the housing 4 and the hydraulic piston 11. A return spring 13 is attached between an upper end wall (a first end wall of one end wall) 4b of the housing 4 and the hydraulic piston 11.

The annular hydraulic piston 11 has a tubular bore 11a, into which the driven rod 6 is inserted. The driven rod 6 has an upper end portion (a first end portion of one end portion) provided with the input portion 6a, around which four transmission members 15 are arranged peripherally side by side. Each of the transmission members 15 is constructed as follows.

The transmission members 15 each has an upper end potion (a first end portion of one end portion) which is provided on its outer peripheral portion with a fulcrum portion 16 in the shape of a flange. The fulcrum portion 16 is swingably and vertically movably supported by the upper end wall 4b of the housing 4. More specifically, four vertically extending guide pins 22 are fixed to the upper end wall 4b. A guide groove 23 of the fulcrum portion 16 engages with each of the guide pins 22 in fitting relationship.

Further, the transmission members 15 each has a lower end portion (a second end portion of the other end portion) which is provided on its inner peripheral portion with an engaging portion 17 which engages with the input portion 6a. The lower end portion is provided on its outer peripheral portion with a first portion 18 to be actuated for engagement. The first portion 18 comprises a truncated-conical segment here. Further, the upper end portion of every transmission member 15 is provided on its inner peripheral portion with a second portion 19 to be actuated for disengagement.

The hydraulic piston 11 has an upper portion which supports a sleeve 26 of a first actuation means radially movably. The sleeve 26 has an inner peripheral portion formed with a slant cam 27. The slant cam 27 is brought into contact with the first portion 18 to be actuated.

A disk-like push member 30 is brought into contact with the second portions 19 to be actuated of the transmission members 15 from above. The push member 30 is pushed downward by a lowering spring (resilient member) 31. A second actuation means 32 comprises the push member 30 and the lowering spring 31.

The clamping apparatus operates as follows.

Figure 2:
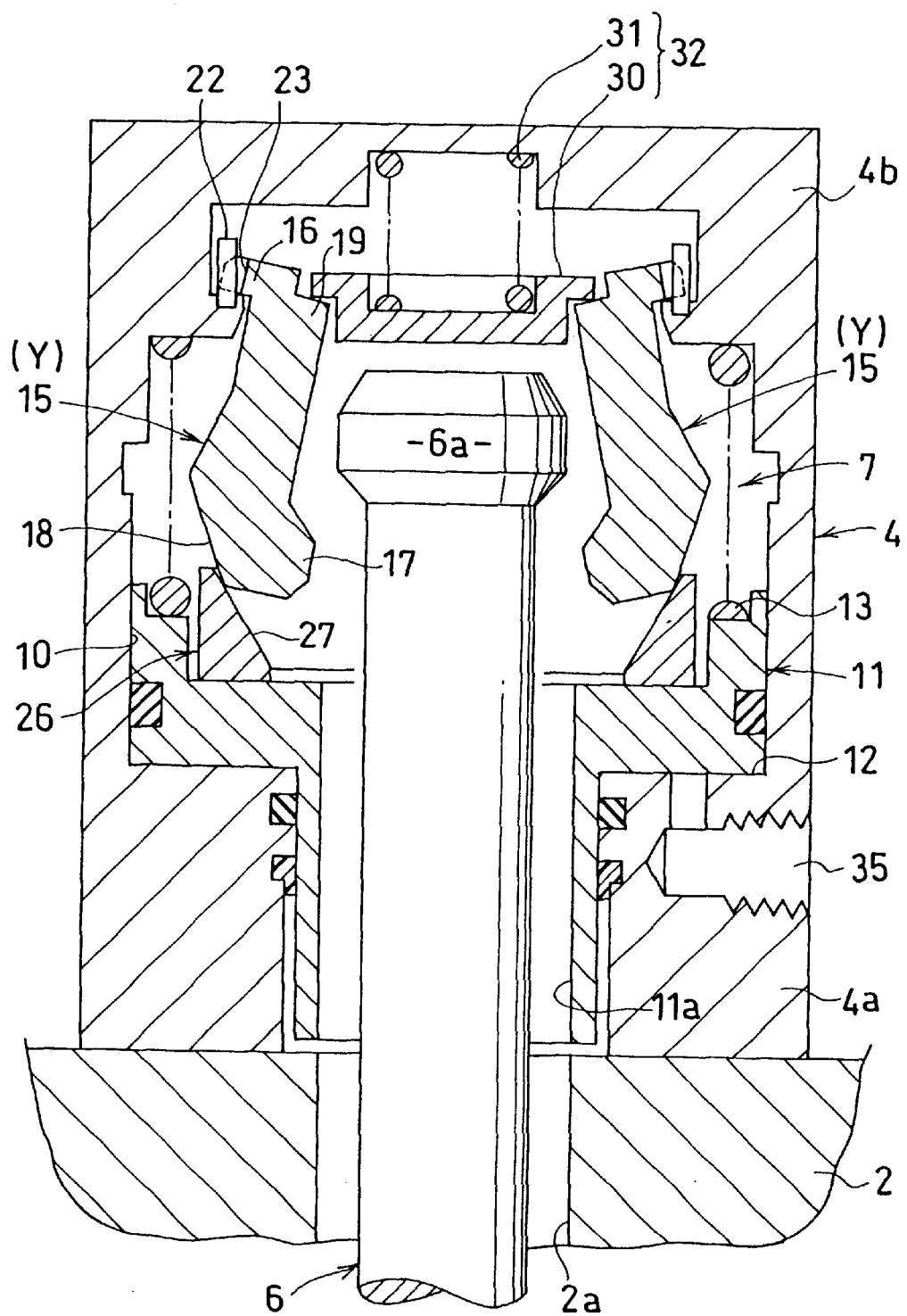

Under the unclamping condition shown in FIG. 2, pressurized oil of the hydraulic actuation chamber 12 is discharged through a pressurized oil supply and discharge port 35. This lowers the hydraulic piston 11 through the return spring 13. Further, every transmission member 15 swings radially outwards around the fulcrum portion 16 by the lowering spring 31 and switches over to a disengaging position (Y).

When changing over the clamping apparatus to the clamping condition, pressurized oil is supplied to the hydraulic chamber 12 through the pressurized oil supply and discharge port 35.

Figure 3:
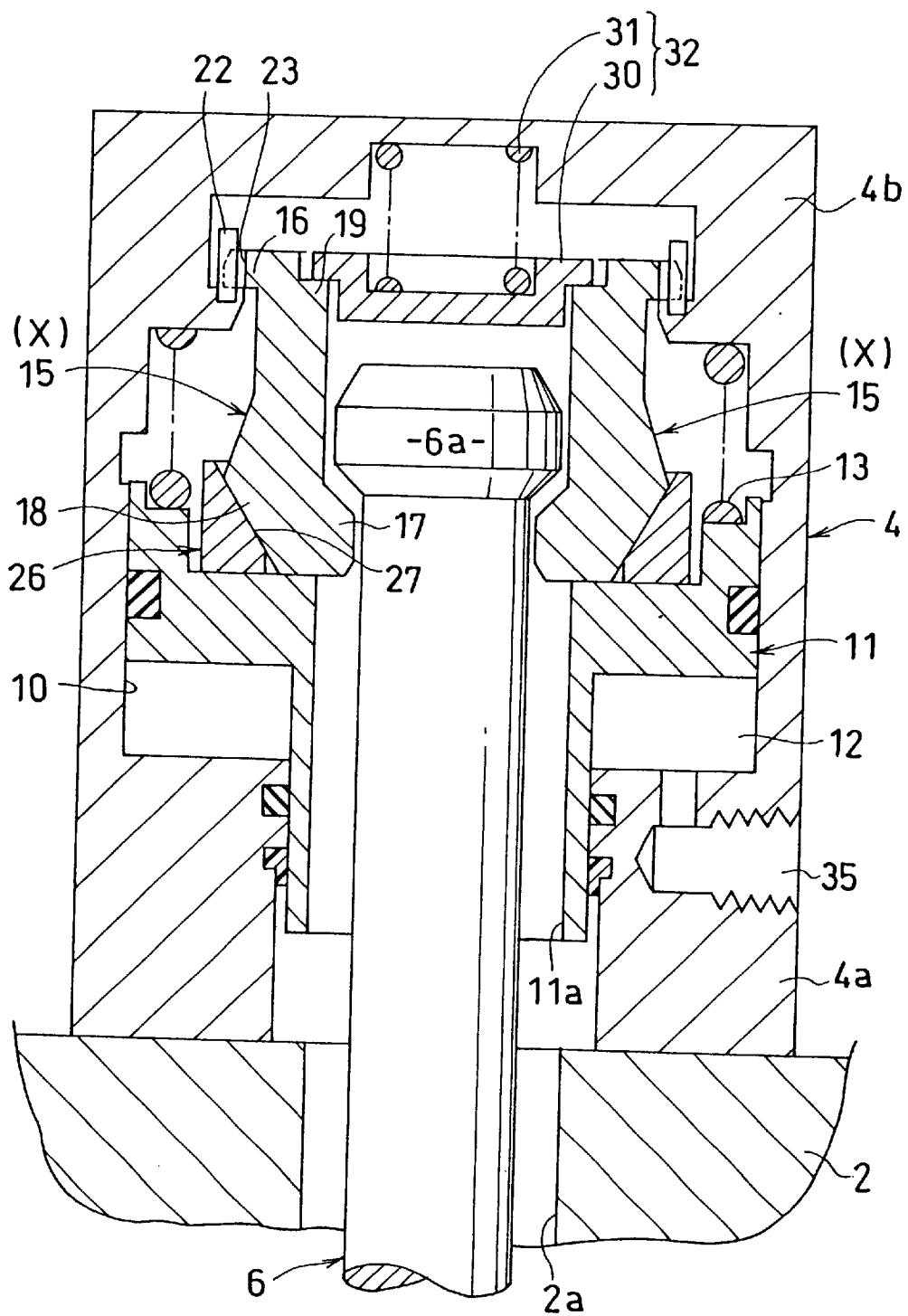

Then, as shown in FIG. 3, the pressurized oil enables the hydraulic piston 11 to raise the sleeve 26. The slant cam 27 of the sleeve 26 swings the transmission members 15 to a radially inward engageable position (X) against the lowering spring 31 (see a view illustrated by a full line in FIG. 5). Thus the engaging portions 17 face the input portions 6a from below.

Figure 4:
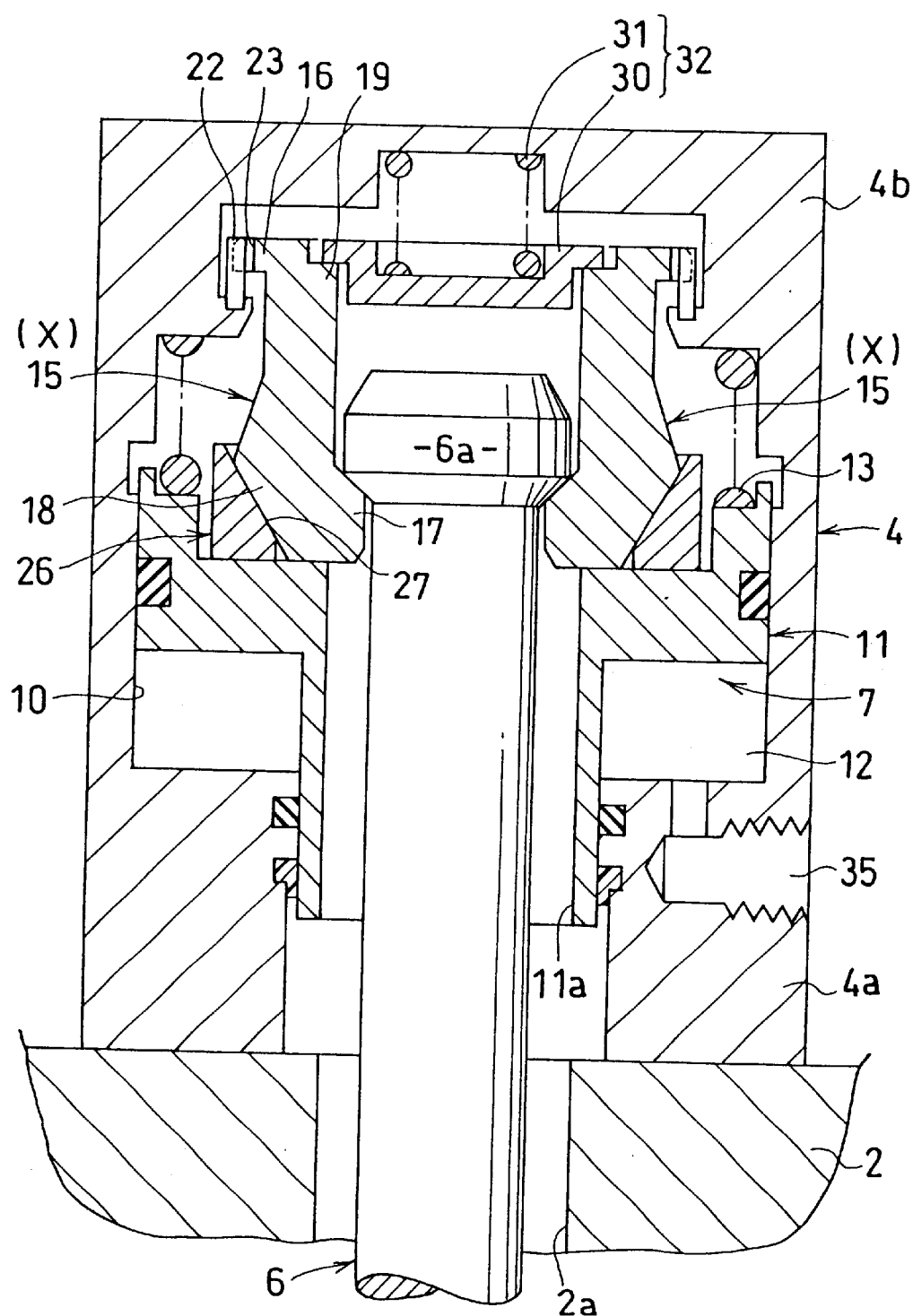
Figure 5:
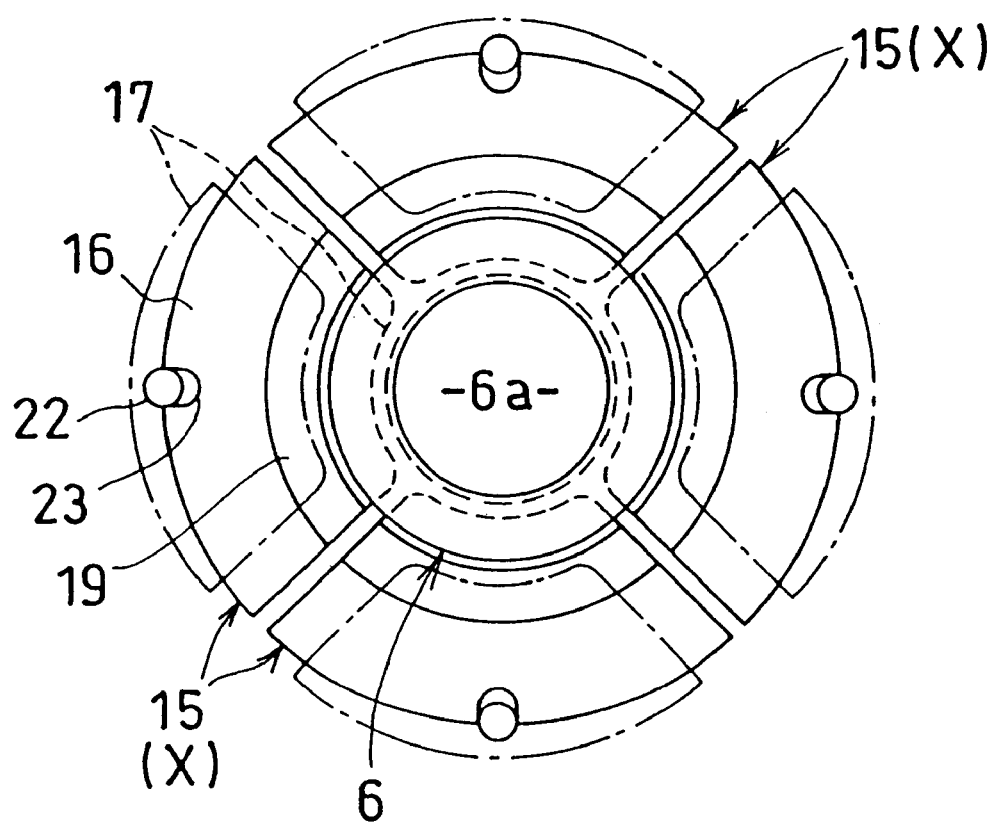

Subsequently, as shown in FIG. 4, the hydraulic piston 11 upwardly drives the transmission members 15 at the engageable position (X) against the lowering spring 31. Then the engaging portions 17 upwardly push the input portion 6a to result in strongly pulling the driven rod 6 upwards. Simultaneously, the pressurized oil within the hydraulic actuation chamber 12 strongly lowers the housing 4 with respect to the hydraulic piston 11. Thus the object 2 to be fixed is fixed to the fixing pedestal 1 (see FIG. 1).

When changing over the clamping apparatus shown in FIG. 4 to the unclamping condition, the pressurized oil is discharged from the hydraulic actuation chamber 12.

Then, as shown in FIG. 3, the hydraulic piston 11 moves down by the return spring 13 and also every transmission member 15 lowers through the lowering spring 31.

Subsequently, as shown in FIG. 2, every transmission member 15 swings radially outwards around the fulcrum portion 16 by the lowering spring 31 and switches over to the disengaging position (Y). This moves the engaging portions 17 radially outwards of an outer peripheral surface of the input portion 6a (see a view shown by a one-dot chain line in FIG. 5). This makes it possible to remove the housing 4 from the driven rod 6.

The above embodiment can be modified as follows.

The sleeve 26 of the first actuation means was radially movably supported by the hydraulic piston 11. Instead, the sleeve 26 may be fixed to the hydraulic piston 11 by a bolt or the like. Alternatively, the sleeve 26 may be formed integrally with the hydraulic piston 11. Besides, the sleeve 26 may be moved by an exclusive driving means separate from the hydraulic piston 11 instead of being moved by the hydraulic piston 11.

The first actuation means is sufficient if it can swing the transmission members 15 from the disengaging position (Y) to the engageable position (X). It is a matter of course that the first actuation means is not limited to the sleeve 26 provided with the slant cam 27.

As for the transmission members 15, the embodiment exemplified a case where four of them were provided. It is preferable to provide at least three ones. Most preferable number of provision is within a range of 4 to 6.

The resilient member of the second actuation means 32 may employ rubber or the like instead of the exemplified lowering spring 31. Further, the second actuation means 32 may utilize other kinds of actuators such as a pneumatic cylinder instead of the resilient member.

The driven rod 6 was fixed to the fixing pedestal 1 and the housing 4 was fixed to the object 2 to be fixed. However, instead, the driven rod 6 may be fixed to the object 2 and the housing 4 may be fixed to the fixing pedestal 1.

The driven rod 6 may be hollow instead of being solid as exemplified. The input portion 6a is sufficient if it is provided near the upper end (one end) of the driven rod 6. Therefore, it may be provided at a vertical halfway of the driven rod 6. Further, the engaging portion 17 is satisfactory if it is provided at a portion close to the lower end (the other end). Accordingly, it may be provided at a vertical halfway of every transmission member 15.

The piston 11 of the driving member may be pneumatic one instead of the hydraulic one. The driving member can be driven for clamping by other means such as a spring instead of being driven for clamping with the fluid pressure such as oil pressure and air pressure.

What is claimed is:

1. A clamping apparatus comprising:

a housing (4) having an axis;

an annular driving member (11) having a tubular bore (11a) and inserted into the housing (4) axially movably;

a driven rod (6) having a portion near a first end and inserted into the tubular bore (11a);

an input portion (6a) provided at the portion near the first end of the driven rod (6);

a plurality of transmission members (15) each having a portion near a first end and a portion close to a second end, and arranged peripherally side by side around the input portion (6a); each transmission member (15) having a fulcrum portion (16) located near the first end thereof and swingably supported by the housing;

an engaging portion (17) provided at the portion close to the second end of each of the transmission members (15) so as to engage with the input portion (6a);

the transmission members (15) being able to switch over by the fulcrum portion (16) between an engageable position (X) where the engaging portions (17) axially face the input portion (6a) when the transmission members (15) swing radially inwards and a disengaging position (Y) where the facing is cancelled when they swing radially outwards, the transmission members (15) at the engageable position (X) being movable toward the first end through the driving member (11);

a first actuation means (26) swinging the transmission members (15) from the disengaging position (Y) to the engageable position (X); and a second actuation means (32) swinging the transmission members (15) from the engageable position (X) to the disengaging position (Y).

2. The clamping apparatus as set forth in claim 1, wherein each of the transmission members (15) has the portion near the first end, which is provided on its outer peripheral portion with the fulcrum portion (16) swingably supported by the housing (4) and has the portion close to the second end, which is provided on its outer peripheral portion with a first portion (18) to be actuated for engagement, the first actuation means (26) being connected to the first portion (18), the portion near the first end of every transmission member (15) being provided on its inner peripheral portion with a second portion (19) to be actuated for disengagement, the second actuation means (32) being connected to the second portion (19).

3. The clamping apparatus as set forth in claim 2, wherein the second actuation means (32) comprises a push member (30) which is brought into contact with the second portions (19) of the transmission members (15), and a resilient member (31) which pushes the push member (30) toward the second end.

4. The clamping apparatus as set forth in claim 1, wherein the housing (4) has a first end wall (4b) and a second end wall (4a), and the driving member (11) comprises a fluid pressure piston, a fluid pressure actuation chamber (12) being formed between the driving member (11) and the second end wall (4a), a return spring (13) being attached between the driving member (11) and the first end wall (4b), the first actuation means (26) being provided with a slant cam (27) connected to the driving member (11).

5. The clamping apparatus as set forth in claim 2, wherein the housing (4) has a first end wall (4b) and a second end wall (4a), and the driving member (11) comprises a fluid pressure piston, a fluid pressure actuation chamber (12) being formed between the driving member (11) and the second end wall (4a), a return spring (13) being attached between the driving member (11) and the first end wall (4b), the first actuation means (26) being provided with a slant cam (27) connected to the driving member (11).

6. The clamping apparatus as set forth in claim 3, wherein the housing (4) has a first end wall (4b) and a second end wall (4a), and the driving member (11) comprises a fluid pressure piston, a fluid pressure actuation chamber (12) being formed between the driving member (11) and the second end wall (4a), a return spring (13) being attached between the driving member (11) and the first end wall (4b), the first actuation means (26) being provided with a slant cam (27) connected to the driving member (11).

* * * * *